July 21, 1925. 1,546,853
N. E. METHLIN
LANDING CARRIAGE FOR AEROPLANES, WATERPLANES,
AND OTHER FLYING MACHINES
Filed Aug. 5, 1924 6 Sheets-Sheet 2

July 21, 1925. 1,546,853
N. E. METHLIN
LANDING CARRIAGE FOR AEROPLANES, WATERPLANES,
AND OTHER FLYING MACHINES
Filed Aug. 5, 1924 6 Sheets-Sheet 3

Inventor
Nicolas Emilien Methlin
By Mauro, Cameron, Lewis & Kirkam
attorneys

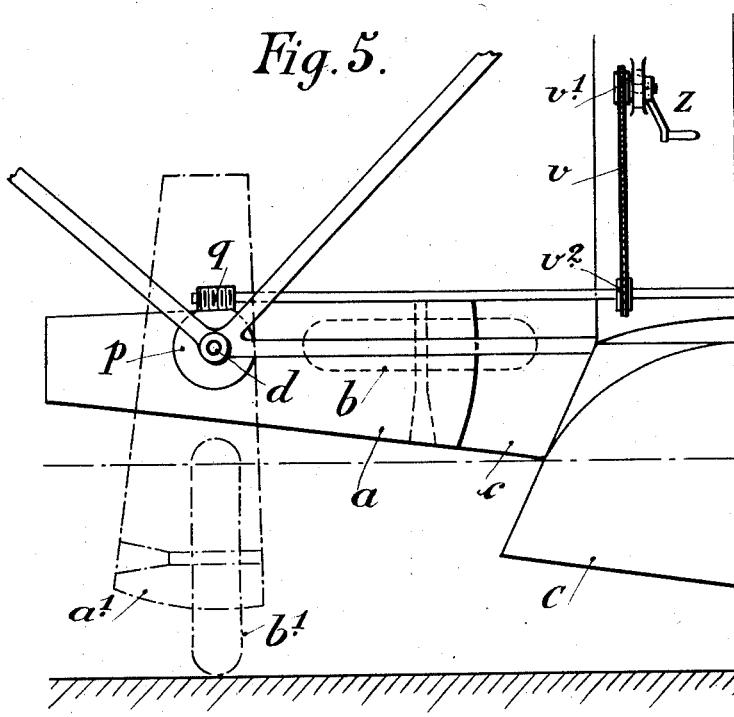
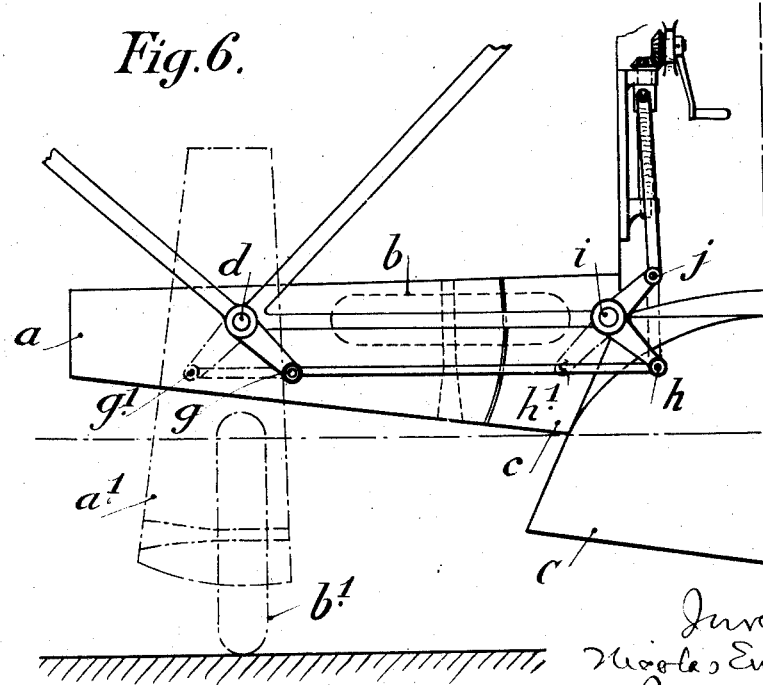

July 21, 1925.

N. E. METHLIN
LANDING CARRIAGE FOR AEROPLANES, WATERPLANES, AND OTHER FLYING MACHINES
Filed Aug. 5, 1924

Patented July 21, 1925.

1,546,853

UNITED STATES PATENT OFFICE.

NICOLAS EMILIEN METHLIN, OF PARIS, FRANCE, ASSIGNOR TO SCHNEIDER & CIE., OF PARIS, FRANCE, A STOCK COMPANY OF FRANCE.

LANDING CARRIAGE FOR AEROPLANES, WATERPLANES, AND OTHER FLYING MACHINES.

Application filed August 5, 1924. Serial No. 730,262.

*To all whom it may concern:*

Be it known that I, NICOLAS EMILIEN METHLIN, a citizen of the Republic of France, resident of Paris, France, have invented new and useful Improvements in Landing Carriages for Aeroplanes, Waterplanes, and Other Flying Machines, which is fully set forth in the following specification.

This invention has for its object to provide an improved landing carriage for aeroplanes and waterplanes.

In the improved landing carriage the supports for the wheels (and, if desired, these supports with the wheels carried by them) are constituted by floats or sustaining surfaces or elements of floats or elements of sustaining surfaces articulated or connected to fixed parts of the flying machine in such a manner as to be capable of being moved by pivotal or other suitable movement into the position where the wheels are able to bear upon the ground with their tires, whilst normally, during navigation, travelling on the water, or during flying they can be raised and then serve as floats or float elements or as sustaining surfaces or elements of sustaining surfaces.

The elements of the landing carriage thus have a double function because, when they are raised out of the way, they contribute to the sustaining or floating of the flying machines, without their resistance to the forward motion of the flying machine being increased thereby in any way.

Various examples of the invention are illustrated in the accompanying drawings in which:

Figures 1, 2 and 3 are respectively a front end elevation partly in section, a longitudinal side elevation and a plan of an example of the application of this invention to the landing carriage of a waterplane.

Figures 4, 5 and 6 respectively illustrate in end elevation three constructional forms of an apparatus for operating the wheel-carriers that constitute a float element.

Figure 1:
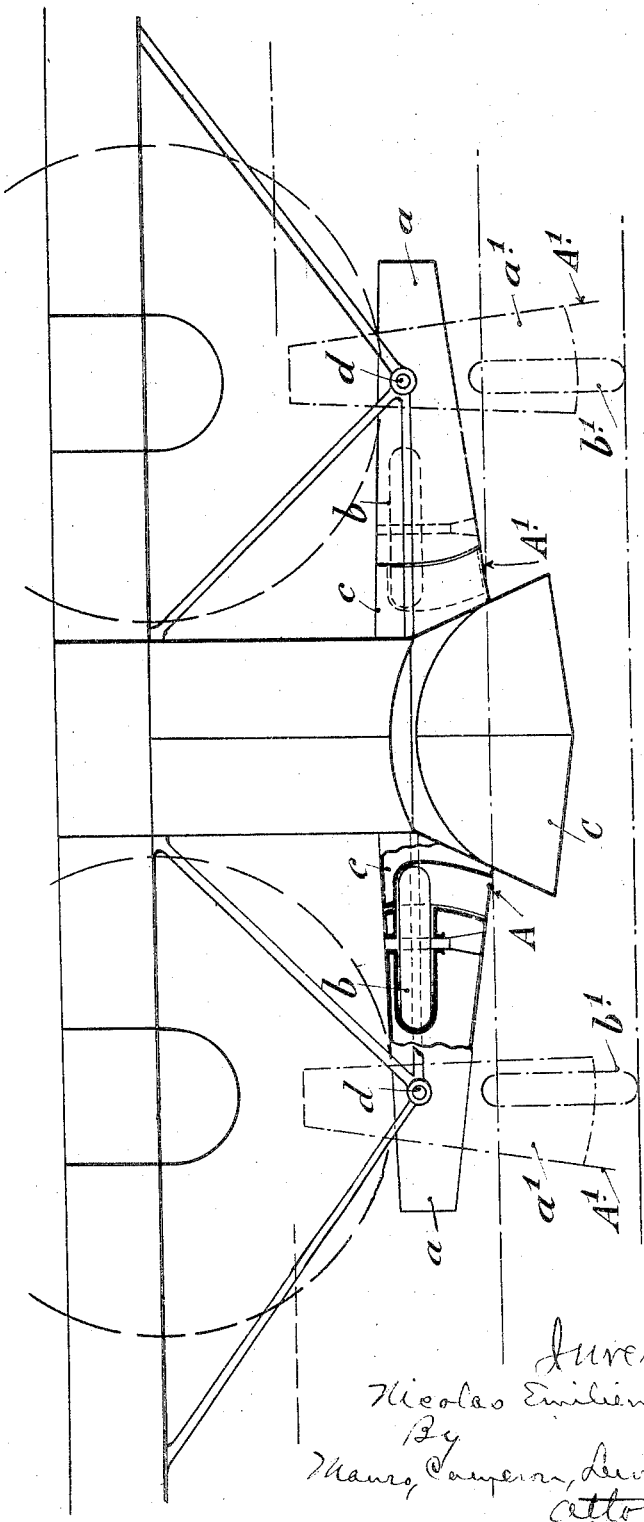

The hydroplane of any known kind comprises as characteristic devices according to this invention two floats $a$ constructed as wheel carriers. In the drawings the said wheel carrying floats are shown in full lines in position for flying or travelling on water; they are indicated in dot and dash lines at $a^1$ in the landing position. In order to enable each of these wheel-carrying floats to change its position (that is to say to pass from the position in which it can serve effectively as a float into the position where it serves as a landing and travelling element) the body $a$ of each float is pivoted on an axle pin $d$ which, as is the case in the illustrated example, may form part of the framing of the waterplane. In the position for navigation, the body $a$ of the wheel-carrying float is kept in prolongation of and flush with a fixed part, for instance an extension $c$ formed on the hull or fuselage C. This extension $c$ is of course suitably profiled, as shown, in order that its upper surface shall merge into the upper surface of the float body $a$ whilst it constitutes a lodgment for the portion of the wheel projecting beyond the body $a$. In the position for navigating or flying the devices (wheel carriers and wheels) serving for landing and travelling on land fit completely, or more accurately speaking are converted as shown into a system of floats, and owing to this double function performed by the wheel-carrier system the resistance offered by it to forward motion is reduced to a minimum.

Each wheel-carrier float may of course carry one or more wheels $b$ which may be suspended resiliently from the body $a$ by any suitable known means. The projection of the wheels beyond the float body $a$ is preferably likewise reduced to a minimum. In the illustrated example there may be arranged, flush with the under-surface of the body $a$, a shutter A which in the position of navigation closes the recess provided in the extension $c$ for the accommodation of the wheel or wheels.

Any suitable mechanism may be employed for operating the wheel-carrying floats.

Figure 4:
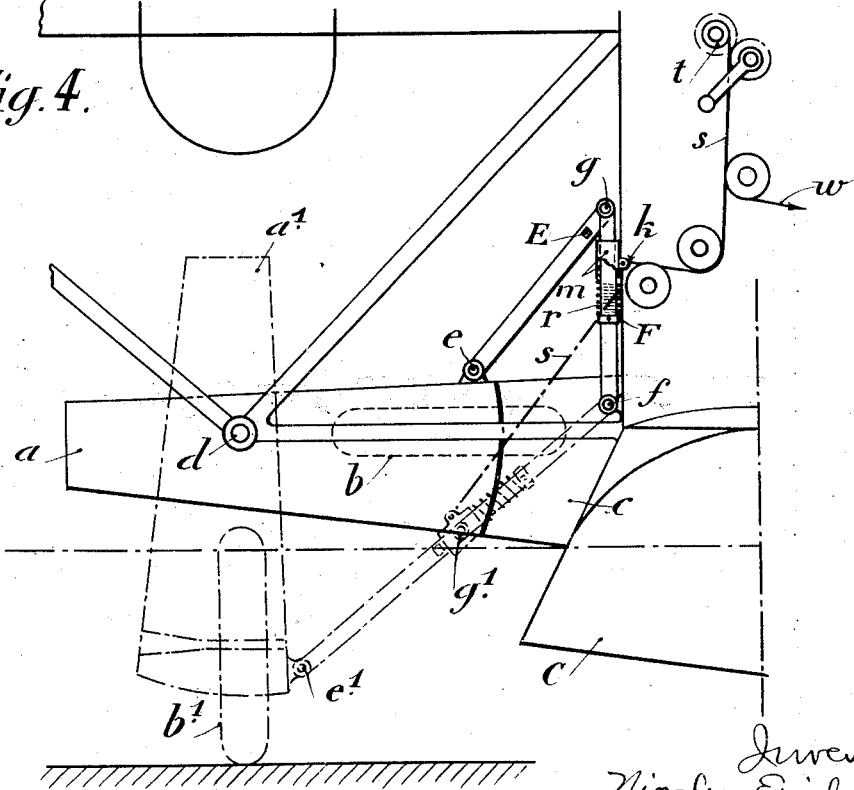

A suitable mechanism for this purpose, which is illustrated by way of example in Figure 4, comprises a folding lever $e$—$g$—$f$ fulcrumed at its centre $g$. The end $e$ is connected to the float by a pivotal pin fixed to any suitable point. The end $f$ is likewise pivoted on a pin secured to a fixed part of the waterplane, for instance to the hull or fuselage. A sleeve $m$ is adapted to slide along the lever so as to lock the joint $g$. This sleeve is normally held in its locking position by a spring $r$ bearing at one end against the sleeve, and at its other end upon a point F of the lever. A stop E serves to limit the stroke of the sleeve $m$ towards the side furthest from the spring $r$. To the sleeve $m$ there is attached a lifting cable $k$—$s$ which is suitably guided and attached to an operating windlass $t$. When the cable is free to unwind, the weight of the float, aided if required by springs (for instance a spiral spring coiled around the axle $d$), brings the wheel-carrying floats into position for travelling on the ground as indicated in dot-and-dash lines. In this movement the lever $e$—$g$—$f$ opens out, and at the end of its stroke the sleeve $m$, pushed by the spring $r$, moves over the joint $g$ and locks it by bearing against the stop E. The float is thus locked in its landing position.

To raise the wheel-carrying floats, it is sufficient to wind in the cable $k$—$s$ by means of the windlass $t$. The sleeve $m$ then first compresses the spring $r$, and unlocks the joint $g$. Then it butts against the spring $r$ at the end of its stroke. The lever which was in the position $e^1$—$g^1$—$f$, is raised and closes like a pair of compasses in assuming the position $e$—$g$—$f$, taking along with it the wheel carrying float so as to bring it into the position of navigation shown in full lines.

Figure 5 illustrates a modification of the operating mechanism. In this example the wheel-carrying float $a$ is provided with a toothed wheel $p$ concentric to the axle $d$. This wheel $p$ meshes with a worm $q$ actuated for instance, by means of a windlass Z, and a chain transmission $v$ and pinions $v^1$, $v^2$.

In the modification illustrated in Figure 6, the float carries a lever $g$—$d$ actuated by a rod $g$—$h$ connected at $h$ to a bell-crank lever $h$—$i$—$j$. On this lever being operated by any suitable mechanism the end $g$ of the lever $g$—$d$ is pulled or pushed, and the wheel-carrying float is caused to turn round the axle $d$.

Figure 7:
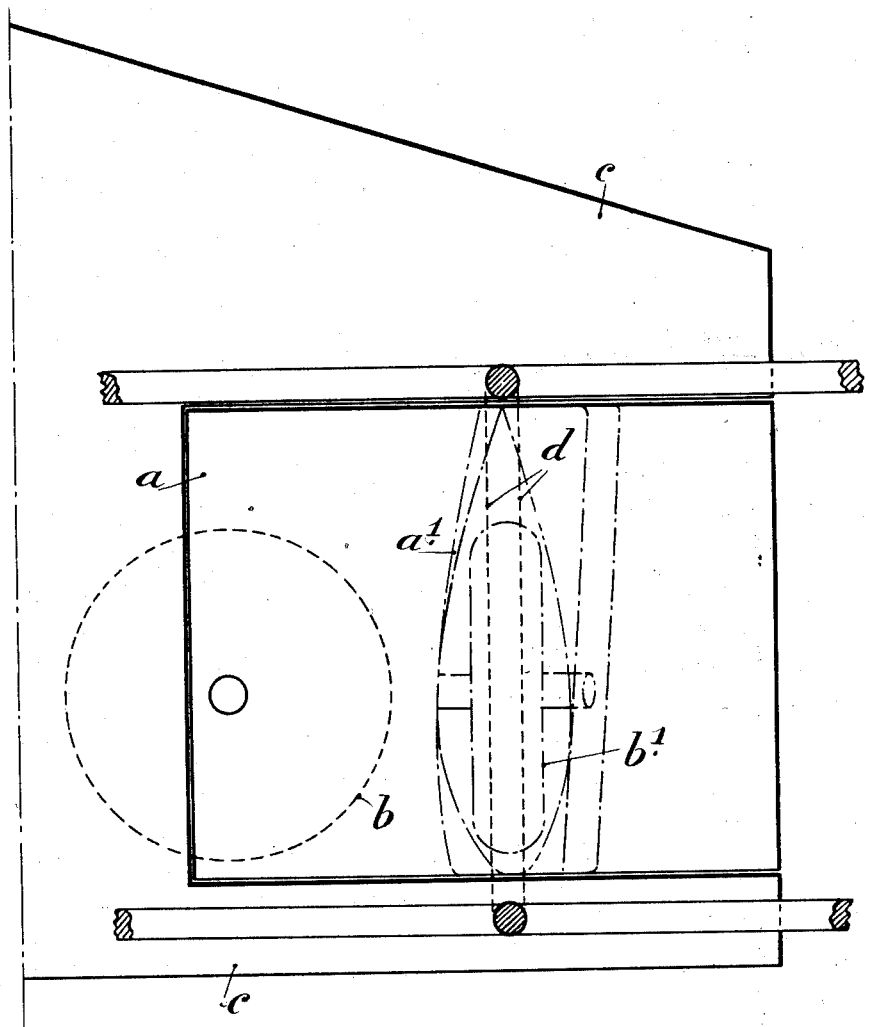
Fig. 7 is a plan view of the invention applied to one of the wings of the aeroplane.

The forms of the fixed and movable parts of the float, that is to say, the wheel-carrying float element, may vary according to the characteristic features of the type of construction of the flying machine. Thus, in order to avoid a too great length of the pivotal axle $d$, the fixed part $c$ may be increased in size as shown in plan in Figure 7, by constructing it in the form of a fork or inverted channel shape so as to enclose on three sides the body $a$ of the wheel-carrying float element.

Inversely, the fixed part may be dispensed with, and the improved apparatus may be operated as a wheel-carrying float absolutely separate from the hull or fuselage.

Figure 8:
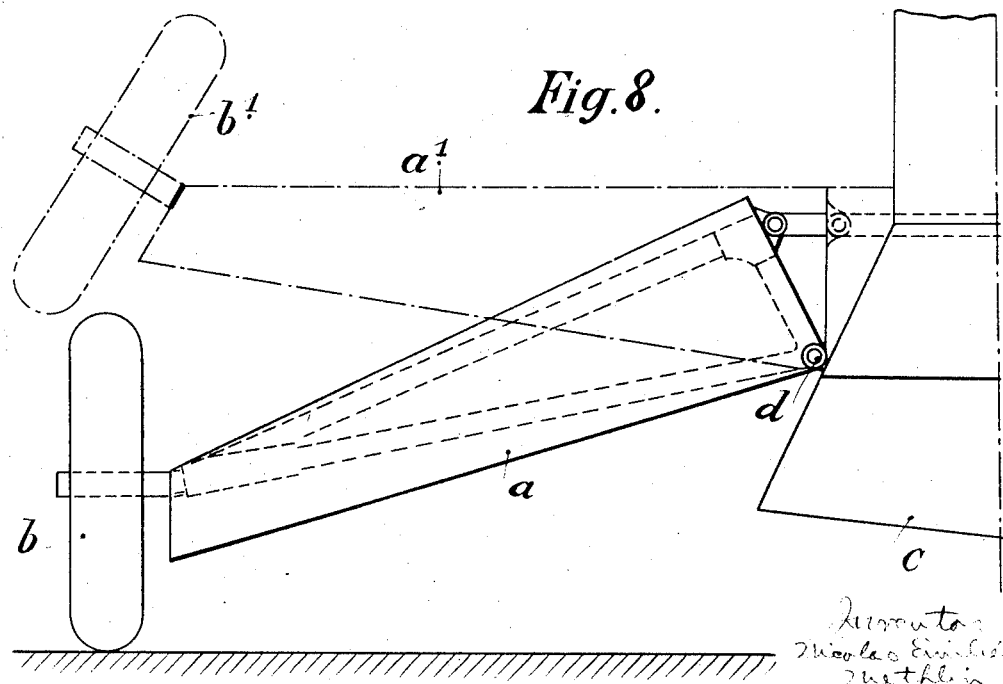
Fig. 8 is a modified form of the invention.

Figure 8 is a partial end elevation of an apparatus of this kind where the wheel is not housed, the wheel-carrying float being adapted to pivot as a whole by means of the float body $a$ around an axle $d$ of the hull C.

Figure 9:
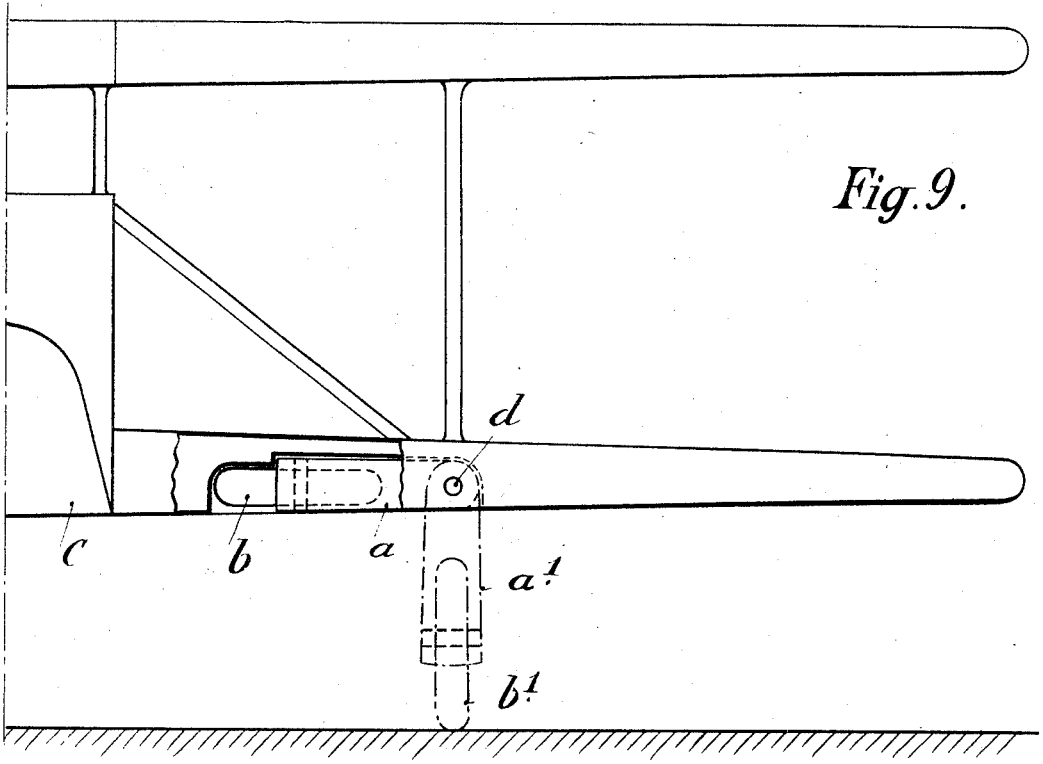
Fig. 9 is a front elevation of Fig. 7.

Figure 9 is a partial end elevation illustrating the application of the invention to an aeroplane. In this example the wheel-carrier $a$—$b$ is constituted by a removable element of the sustaining surface. The passing from the flying position into the position for travelling on the ground may be secured by articulating the wheel-carrying element on an axle $d$, the parts being operated by means of a lifting mechanism similar to those hereinbefore described. In the position for navigation the whole of the movable system is folded back into a recess provided in the interior of the wing. For landing and flying off, the wheels are moved into the position indicated in dot-and-dash lines ($a^1$—$b^1$).

Figure 2:
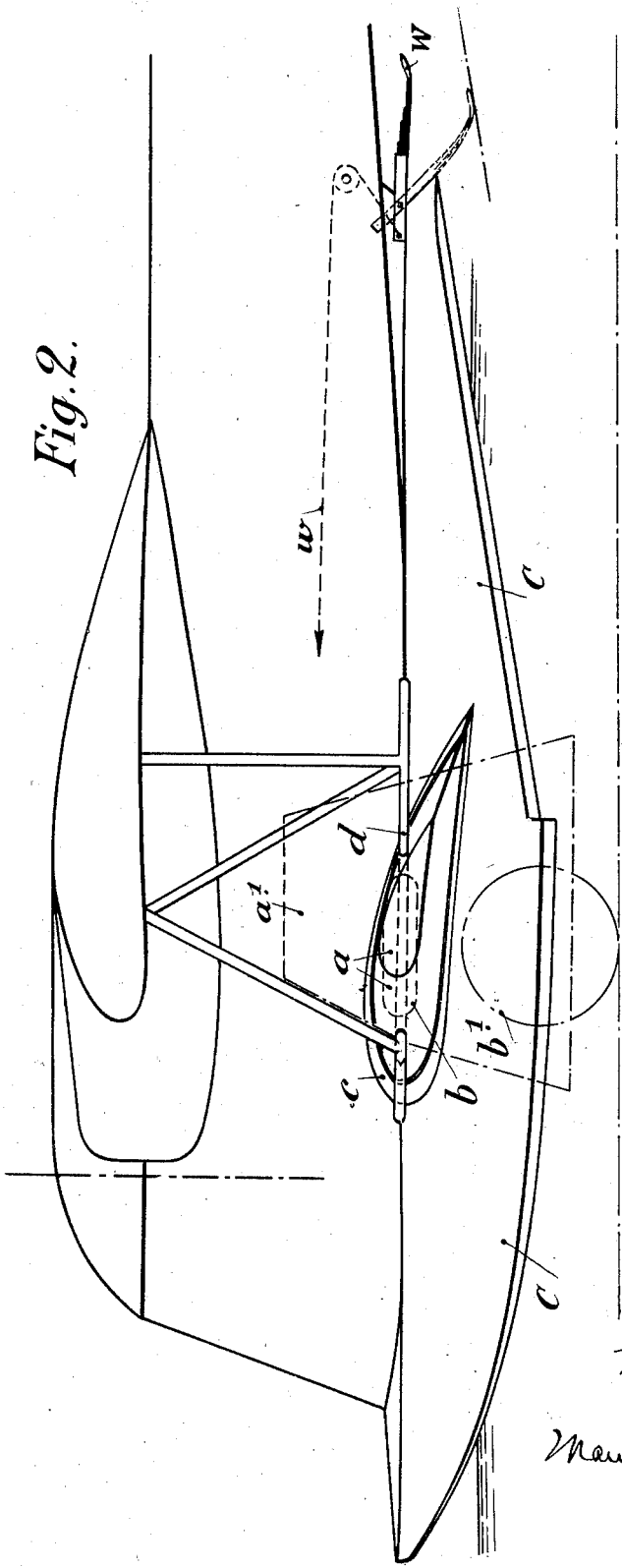
Figure 3:
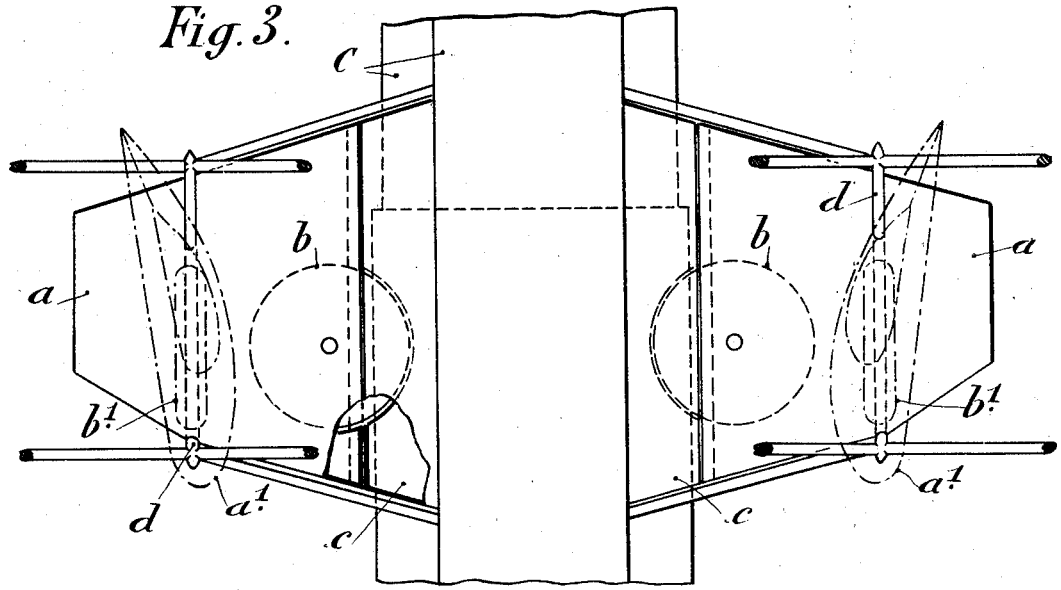

The lifting and lowering movement of the wheel-carrying floats may be co-ordinated with those of one or more back struts W (Fig. 2) movably jointed to the rear portion of the float body C. This co-ordination may be produced for instance by means of a cable $w$ attached to the drum of the windlass $t$ (Fig. 4).

Having now particularly described and ascertained the nature of my said invention and in what manner the same is to be performed, I declare that what I claim is:

1. In a flying machine, a fuselage having fixed oppositely disposed lateral extensions, float members hinged to the framework of the plane one opposite each lateral extension and normally lying flush therewith, ground-engaging members carried by said float members, and means for turning said float members on their hinge.

2. In a flying machine, a fuselage having fixed oppositely disposed lateral extensions, float members hinged to the framework of the machine one opposite each lateral extension and normally lying flush therewith, ground engaging members carried by said float members and partially housed within said float members and partially within said extensions when said float members are in normal position, and means for turning said float members on their hinges to place said ground-engaging members in ground-engaging position or in housed position as desired.

3. In combination, an aircraft body, upper supporting wings secured to the body, and lower supporting wings secured to the body including pivotal wing sections, ground engaging members mounted in said sections and normally housed in said lower wings, and means for moving said sections and members to bring the latter into ground engaging position.

In testimony whereof I have signed this specification.

NICOLAS EMILIEN METHLIN.

Witnesses:
 ANDRÈ MOSTICKER,
 LOUIS GARDET.